Patented Sept. 12, 1922.

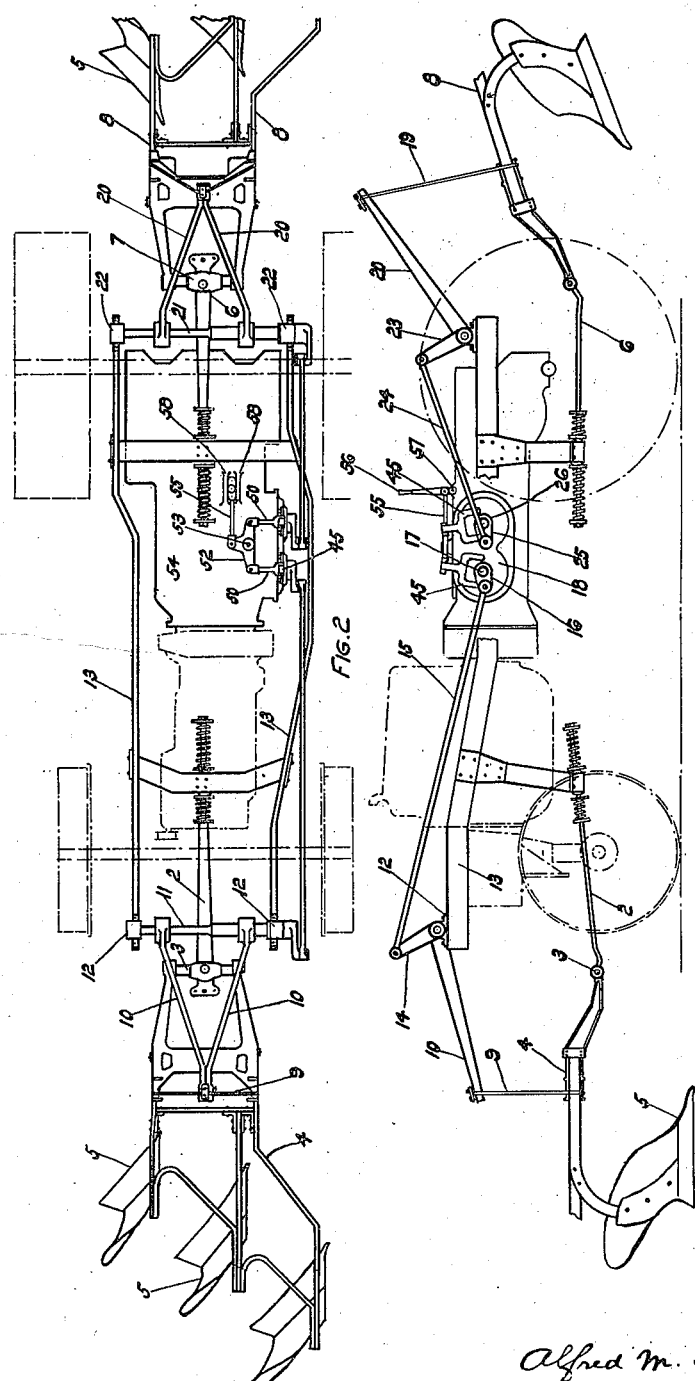

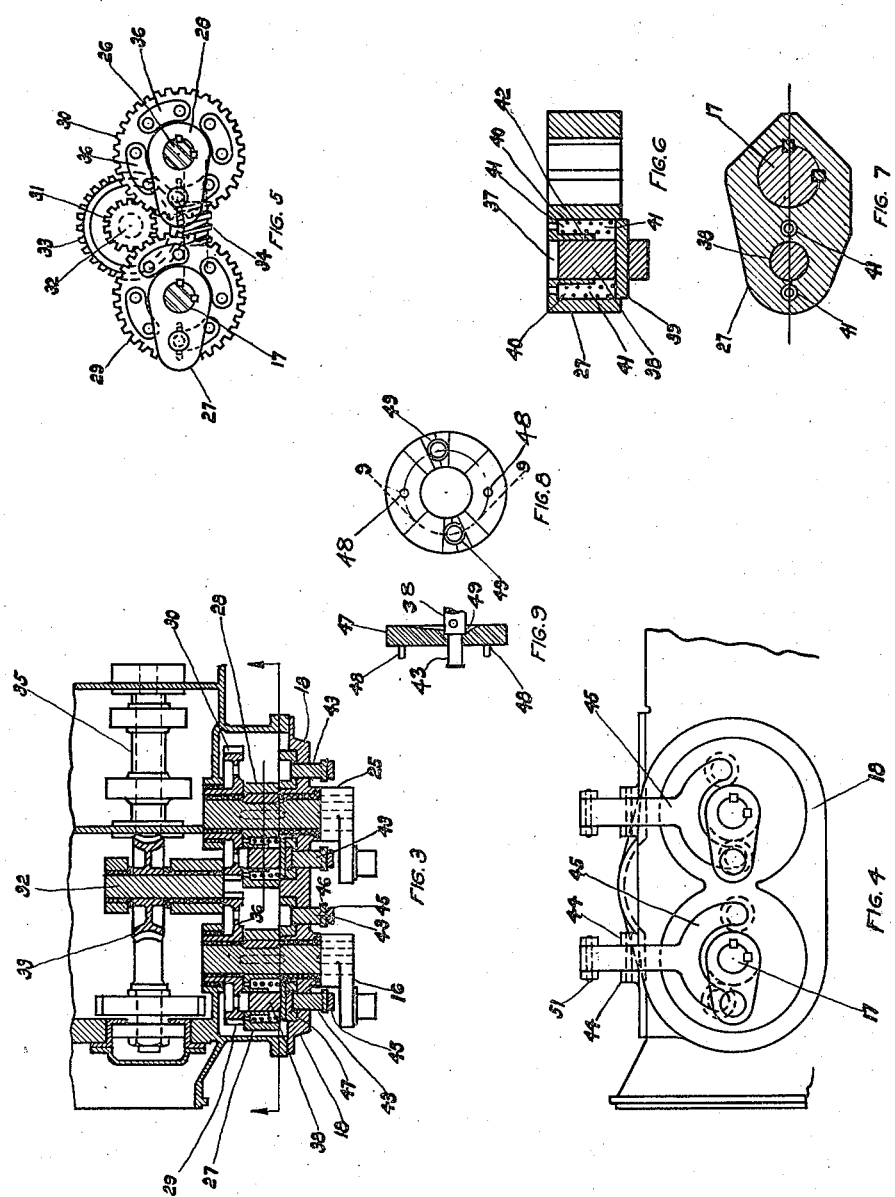

1,429,048

UNITED STATES PATENT OFFICE.

ALFRED M. SCHLAGEL, OF MONTGOMERY COUNTY, NEAR DAYTON, OHIO, ASSIGNOR TO RIAL T. PARRISH, OF DAYTON, OHIO.

HOISTING AND LOCKING MECHANISM FOR PLOWS.

Application filed October 21, 1921. Serial No. 509,243.

*To all whom it may concern:*

Be it known that I, ALFRED M. SCHLAGEL, a citizen of the United States, residing in the county of Montgomery, near the city of Dayton, State of Ohio, have invented certain new and useful Improvements in Hoisting and Locking Mechanism for Plows, of which the following is a specification.

The principal object of the invention is to provide a simple, efficient and readily operated mechanism for hoisting the plows of tractors and other implements, and locking them in their elevated positions. This mechanism, for example, enables a two-way tractor to which two sets of plows are attached, to move forward or backward with one set of plows in the ground and the other set high enough above the latter for proper clearance.

Other important and incidental objects will be brought out in the following specification and particularly set forth in the subjoined claims.

In the accompanying drawings, Figure 1 is a side elevational view of a portion of a tractor, showing my plow hoisting and locking mechanism attached thereto. Figure 2 is a top plan view of the same. Figure 3 is a cross sectional view of the plow hoisting and elevating mechanism. Figure 4 is a side elevational view of the same looking in the direction of the arrows in Figure 3. Figure 5 is a side elevational view of the operating gears. Figure 6 is an enlarged cross sectional view of the crank and the locking plunger therefor. Figure 7 is a longitudinal section taken through the same. Figure 8 is a side elevational view of one of the locking cams. And Figure 9 is a cross section taken through the same, on the line 9—9 of Figure 8.

Throughout the specification and drawings, similar reference characters denote corresponding parts.

In a detailed description of the embodiment of my invention shown in the accompanying drawings, the numeral 1 designates a tractor to the front draw bar 2 of which there is secured a cross member 3. Pivotally secured to each end of the latter is a plow beam 4 which supports at its front end a plow bottom 5. (See Figures 1 and 2.)

The tractor also has a rear draw bar 6 to which there is secured a cross member 7. Pivotally secured to each end of the latter is a plow beam 8. (See Figures 1 and 2.)

For the purpose of raising the plow beams 4, 4 and 8, 8, the following means are provided. Looped around each plow beam 4 is the free end of a steel cable 9, the upper portion of which is connected to the meeting ends of two inclined lifting arms 10, 10 fixedly secured to a transverse shaft 11. The latter is supported by two journals 12, 12, each of which is mounted upon a side frame member 13. (See Figures 1 and 2.)

Secured to the outer end of the shaft 11 on the left-hand side of the tractor, is a crank arm 14 to the free end of which is secured the front end of a pull rod 15, the other end of which is secured to a crank 16 fast on the outer end of a transverse shaft 17 journaled in a cover plate 18. (See Figures 1 and 3.)

Looped around each plow beam 8 is the free end of a steel cable 19, the upper portion of which is connected to the meeting ends of two inclined lifting arms 20, 20 secured to a transverse shaft 21. The latter is supported by two journals 22, 22, each of which is mounted on a side frame member 13. (See Figures 1 and 2.)

Secured to the outer end of the shaft 21 on the left-hand side of the machine, is a crank arm 23 to the free end of which is secured the front end of a pull rod 24, the other end of which is secured to a crank 25 fast on the outer end of a transverse shaft 26 also journaled in the cover plate 18. (See Figures 1 and 3.)

Keyed on the shaft 17 is an inner crank 27, and on the shaft 26 is keyed a similar inner crank 28. (See Figures 3, 5 and 6.) Means now to be described are provided to turn the two inner cranks 27 and 28 for the purpose of rotating the shafts 17 and 26 to which the outer cranks 16 and 25 are secured. Loosely mounted on the shaft 17 immediately behind the inner crank 27, is a gear 29. A similar gear 30 is loosely mounted on the shaft 26 immediately behind the inner crank 28. Both of the gears 29 and 30 are in mesh with a pinion 31 fast on a shaft 32 on which a worm gear 33 is also fixedly secured. The latter gear is in mesh with a worm 34 secured on a counter transmission shaft 35 that is driven by the main transmission shaft of the tractor, not shown.

Referring to Figures 3 and 5, there are provided in the web of each one of the gears 29 and 30, four or more circumferential grooves 36. Axially movable through a hole 37 in the outer end of each one of the cranks 27 and 28, is an inner crank pin 38. (See Figures 3 and 6.) Projecting through the outer end of each inner crank pin 38 is a cross pin 39 against which press two springs 40, 40 located in holes 41, 41 respectively within each one of the inner cranks. (See Figures 6 and 7.) Each one of the cross pins 39 may be moved inwardly through its respective hole 37 in the crank, against the compression of the springs 40, 40, until it engages the end of a cylindrical guide 42 for the crank pin 38 within said hole. (See Figure 6.) This inward movement of the cross pin 39 is sufficient to permit the outer end of its respective crank pin 38 to be forced into one of the grooves 36 in the gear behind, by the following means.

Inwardly movable through holes in the cover plate 18, are four push pins 43. Two of the latter are located to engage, at different times, the right hand crank pin 38, while the other two push pins 43, 43 are located to engage, at different times, the left hand crank pin 38. Now, when one of the crank pins 38 is in a position opposite a push pin 43, the latter may be forced inwardly to press that crank pin into one of the grooves 36 in the web of the gear wheel behind, by the following means.

Referring to Figures 3 and 4, there is pivotally secured between a pair of bosses 44, 44 on the cover plate 18 above each one of the shafts 17 and 26, a fork 45. The lower ends of each fork 45 are located to engage and push inwardly each pair of push pins 43, when the upper end of the fork is forced outwardly by means hereinafter to be described. In order that it may be readily engaged by its respective lower end of a fork 45, each push pin 43 has an enlarged end portion 46.

The outer end of each inner crank pin 38 travels upon the sloping surface of a ring cam 47 that is firmly secured to the cover plate 18 by dowel pins 48, 48. Provided in each ring cam are two bores to receive the push pins 43, 43. (See Figures 3, 8 and 9.) Two counterbores 49, 49 are provided in each one of the ring cams 47, to receive the inner end of a respective crank pin 38, to permit the latter to be engaged by one of the push pins 43. The thickest points of each ring cam 47 are approximately midway between the counterbores 49, 49, toward each one of which the surface of the cam gradually slopes. (See Figures 3, 8 and 9.)

When the inner end of the crank pin 38 of one of the inner cranks, is within one of the counterbores 49 of the ring cam, it is in a position to be engaged by one of the push pins 43 and forced inwardly thereby into one of the grooves 36 in the gear behind. Then, as the gear continues its rotation, it will, through said crank pin, start the rotation of the inner crank which contains said crank pin. When the inner crank starts to rotate, it will draw the inner end of the crank pin over the end of the push pin 43 that engaged it, onto the sloping surface of the ring cam 47. Now, since the ring cam increases in thickness to a point midway between the counterbores 49, 49, the crank pin 38 will be prevented from being pulled, by the springs 40, 40, out of the groove 36 into which it projects in the gear, by the sloping surface of the cam. Therefore, the inner crank will be rotated by the gear until the next counterbore 49 is reached, at which time the crank pin 38 will be withdrawn from engagement with the gear by the springs 40, 40. This is due to the fact that the counterbore is of sufficient depth to permit the crank pin, when it has entered it, to clear the web of the gear. The inner crank is then locked against movement until one of the push pins 43 again forces its crank pin 38 into engagement with said gear.

The means for operating the forks 45, 45 to depress the push pins 43, will now be described. The upper end of each fork 45 is straddled by a link 50, which is pivotally secured to said fork by a pin 51. (See Figures 1, 2 and 4). At its rear end each link 50 is pivotally secured to a respective end of a double bell crank lever 52, the latter being pivotally secured by a pin 53 to the transmission housing 54. Pivotally secured to the upper end of the double bell crank lever 52 is the front end of a link 55, the rear end of which is pivotally secured to a handle lever 56. The lower end of the latter is pivotally secured by a pin 57, between two raised portions 58, 58 on the transmission housing 54. (See Figures 1 and 2.)

When the handle lever 56 is pushed by the operator, toward the front plows 5, it will, through the link 55, push the front end of the bell crank 52 toward the front fork 45. Therefore, the link 50 attached to the front end of the double bell crank 52, will push the upper end of the front fork 45 outwardly. Thereupon the lower ends of the front fork 45 will press the front push pins 43, 43 inwardly. As before described, one of these push pins 43 will then engage and force inwardly into one of the grooves 36 in the front gear 29, the front crank pin 38 to cause the front inner crank 27 to be rotated by that gear until the crank pin 38 is permitted to enter the next counterbore 49, at which time the rotation of said crank will be stopped. The rotation of the inner crank 27 during that period will rotate the shaft 17 on which it is fast. Also fast on the shaft 17 is the outer crank 16 to which the rear end of the pull rod 15 is secured. This rod will then be drawn inwardly by the crank 16 to lift the front plows 5, through the crank 14, lifting arms 10, 10, cable 9 and plow beams 4. This elevation of the plows 5 will be sufficient to enable them to clear obstructions on the ground. So soon as the plows 5 have been brought to their maximum elevation, the front crank pin 38 will have reached the next counterbore 49, whereupon the springs 40, 40 will draw its inner end into said counterbore to lock the plows 5 in their elevated position and to force the push pin 43 which it engages, outwardly to return the handle lever 56 to its normal vertical position.

In order to lower the rear plows, the handle lever 56 is drawn rearwardly by the operator to pull the upper end of the double bell crank 52 rearwardly through the link 55. Thereupon the link 50 secured to the rear end of the double bell crank lever 52, will push the upper end of the rear fork 45 outwardly. The lower ends of the rear fork 45 will then press the rear push pins 43, 43 inwardly. One of these push pins 43 will then engage and force inwardly into one of the grooves 36 in the rear gear 30, the rear crank pin 38 to cause the rear inner crank 28 to be rotated by that gear until said crank pin 38 is permitted to enter the next counterbore 49, at which time the rotation of said crank will be stopped. The rotation of the inner crank 28 during that period will turn the shaft 26 on which it is fast. Also fast on the shaft 26 is the outer crank 25 to which the front end of the pull rod 24 is secured. The starting position of the outer crank 25 is such as to push the rod 24 outwardly when said crank is turned by the continuously rotating gear 30. Thereupon the rear plows carried by the beams 8, will be permitted to descend to the ground. By pushing the handle lever 56 toward them, the front plows may be lowered in the same manner. Then, by pulling the handle lever 56 toward the rear plows, they may be elevated in a manner similar to that described for elevating the front plows. It is thus seen that the handle lever 56 is always moved toward the plows which it is desired to raise or lower. It is also important to observe that the raising of the plows is effected, and the lowering of them is assisted, by the power driven gears 29 and 30. Furthermore, the plows are locked in their elevated position, and the handle lever is returned to its normal position, entirely by automatic means.

I do not wish to be limited to the details of construction and arrangement herein shown and described, and any changes or modifications may be made therein within the scope of the subjoined claims.

Having described my invention, I claim:

1. In a device of the type described, the combination with a plow beam, a plow carried thereby, of elevating mechanism for said plow beam, a driving gear, a rotatable shaft transverse to said gear, an inner crank fast on said shaft, an outer crank also fast on said shaft, a connecting element between the outer crank and the plow elevating mechanism, a crank pin in the inner crank, movable into engagement with the driving gear, a push element adapted to force said crank pin into engagement with the driving gear, a lever, and means actuated by said lever, adapted to engage and force the push element inwardly a sufficient distance to press the crank pin into engagement with the driving gear, whereby the inner crank may be turned by the latter to actuate the plow elevating mechanism through the outer crank.

2. In a device of the type described, the combination with a plow beam, a plow carried thereby, of elevating mechanism for said plow beam, a driving gear having a series of curved grooves in its web portion, a rotatable shaft transverse to said gear, an inner crank fast on said shaft, in proximity to said gear, an outer crank also fast on said shaft, a rod connecting the outer crank and the plow elevating mechanism, a crank pin in said inner crank, movable into one of the grooves in said gear, a push pin adapted to engage the crank pin to force it into one of the grooves in said gear, a lever, a pivoted element, one end of which is adapted to engage said push pin, and means connected between the other end of the pivoted element and the lever, to force the push pin inwardly a sufficient distance to press the crank pin into one of the grooves in the driving gear, whereby the inner crank may be turned by the latter to actuate the plow elevating mechanism through the outer crank.

3. In a device of the type described, the combination with a plow beam, a plow carried thereby, of elevating mechanism for said plow beam, a driving gear, rotatable means in proximity to said driving gear, means operatively connecting the rotatable means and plow elevating mechanism to actuate the latter when the rotatable means are turned, a device carried by the rotatable means, for locking engagement with the driving gear, a lever, means adapted to be actuated by said lever to force the locking device into engagement with the driving gear, and a stationary cam over which said locking device is adapted to travel, to automatically hold it in engagement with the driving gear for a given period of time, for the purpose specified.

4. In a device of the type described, the combination with a plow beam, a plow carried thereby, of elevating mechanism for said plow beam, a driving gear, rotatable means in proximity to said driving gear, means operatively connecting the rotatable means and the plow elevating mechanism to actuate the latter when the rotatable means are turned, a locking element carried by the rotatable means for engagement with the driving gear, a stationary ring cam, a raised surface on said ring cam over which said locking element travels, to hold it in engagement with the driving gear, a recess in said ring cam at the end of its raised surface, and resilient means adapted to draw the locking element a sufficient distance into said recess to withdraw its other end from locking engagement with the driving gear, after said element has traveled over the raised surface of the ring cam, for the purpose specified.

5. In a device of the type described, the combination with a plow beam, a plow carried thereby, of elevating mechanism for said plow beam, a driving gear, a rotatable shaft transverse to said gear, an inner crank fast on said shaft, an outer crank also fast on said shaft, a rod connecting the outer crank and the plow elevating mechanism, the inner crank having an axial hole therein, a crank pin movable through said hole into locking engagement with the driving gear, resilient means in said hole adapted to withdraw the outer end of said crank from engagement with the driving gear, a ring cam having two counterbores therein, into either one of which the inner end of the crank pin is adapted to project when its outer end is withdrawn from engagement with the driving gear by the resilient means, said ring cam having two bores communicating with said counterbores, push pins adapted to project through said bores into engagement with the inner end of the crank pin when the latter is in one of said counterbores, a pivoted fork, the fork ends of which are adapted to engage the push pins, a lever, means connected between the latter and the handle end of the fork to force one of the push pins inwardly a sufficient distance to press the crank pin into locking engagement with the driving gear, and a raised surface on said cam, over which the inner end of the crank pin travels after it leaves the counterbore in which it was engaged by a push pin, to hold said crank pin in locking engagement with the driving gear until it reaches the next counterbore.

In testimony whereof I have hereunto set my hand this 20 day of October, 1921.

ALFRED M. SCHLAGEL.

Witness:
HOWARD S. SMITH.